United States Patent
Hallenberg et al.

(10) Patent No.: US 9,436,322 B2
(45) Date of Patent: Sep. 6, 2016

(54) SYSTEM AND METHOD FOR COMMUNICATING THROUGH A CAPACITIVE TOUCH SENSOR

(75) Inventors: Peter G. Hallenberg, Chicago, IL (US); Erik Hove, Chicago, IL (US)

(73) Assignee: Chewy Software, LLC, Chicago, IL (US)

(*) Notice: Subject to any disclaimer, the term of this patent is extended or adjusted under 35 U.S.C. 154(b) by 0 days.

(21) Appl. No.: 13/589,084

(22) Filed: Aug. 17, 2012

(65) Prior Publication Data

US 2013/0044078 A1     Feb. 21, 2013

Related U.S. Application Data

(60) Provisional application No. 61/524,733, filed on Aug. 17, 2011.

(51) Int. Cl.
| | |
|---|---|
| *G06F 3/045* | (2006.01) |
| *G06F 3/044* | (2006.01) |
| *G06F 3/039* | (2013.01) |
| *G06F 3/0354* | (2013.01) |

(52) U.S. Cl.
CPC .............. *G06F 3/044* (2013.01); *G06F 3/039* (2013.01); *G06F 3/03545* (2013.01)

(58) Field of Classification Search
CPC ...... G06F 3/044; G06F 3/045; G06F 3/0412; G06F 3/0416; G06F 3/046; G01R 27/2605; G01R 31/028; G01D 5/24; G06K 9/0002; H03K 17/062
See application file for complete search history.

(56) References Cited

U.S. PATENT DOCUMENTS

| | | | |
|---|---|---|---|
| 2009/0322352 A1* | 12/2009 | Zachut et al. ................. | 324/658 |
| 2012/0327040 A1* | 12/2012 | Simon ..................... | G06F 3/044 345/179 |
| 2013/0088465 A1* | 4/2013 | Geller et al. .................. | 345/179 |

* cited by examiner

*Primary Examiner* — Lixi C Simpson
*Assistant Examiner* — Ngan T Pham Lu
(74) *Attorney, Agent, or Firm* — Richards Patent Law PC

(57) ABSTRACT

Devices and methods for communicating information through a capacitive touch sensor based on patterns. In one example, a device for communicating a plurality of distinct patterns through a conductive element includes: a conductive element adapted to conduct a first pattern and a second pattern, wherein the first conducted pattern and the second conducted pattern each provide a uniquely identifiable parasitic capacitance effect on a capacitive touch sensor; and a selector for selecting between conducting the first pattern and the second pattern. A method of communicating through a capacitive touch sensor, includes the steps of: providing a device for communicating a plurality of distinct patterns through a conductive element; placing the conductive element in contact with a capacitive touch sensor; and interpreting the parasitic capacitance effect on the capacitive touch sensor to determine whether the device is communicating the first pattern or the second pattern.

7 Claims, 7 Drawing Sheets

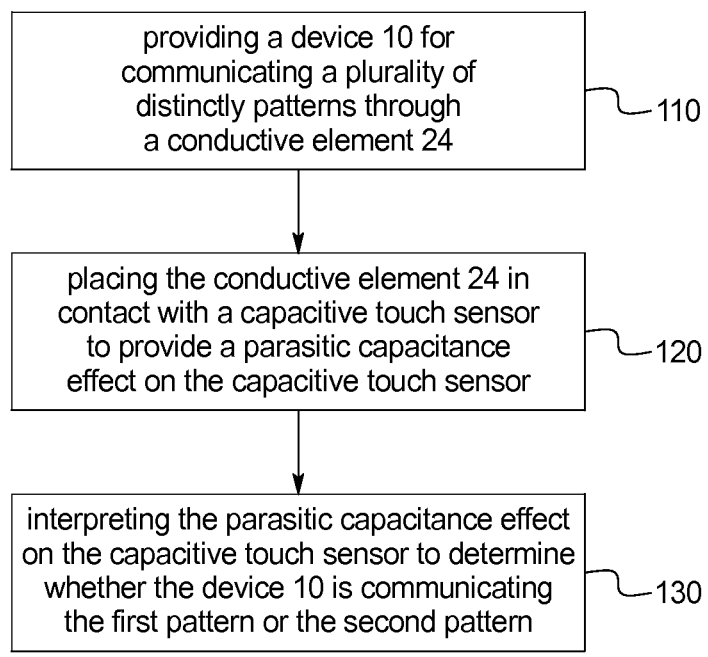

SYSTEM AND METHOD FOR COMMUNICATING THROUGH A CAPACITIVE TOUCH SENSOR

CROSS-REFERENCE TO RELATED APPLICATIONS

This application incorporates by reference and claims priority to U.S. Provisional Patent Application No. 61/524,733 filed Aug. 17, 2011.

BACKGROUND OF THE INVENTION

The present subject matter relates generally to a system and method for communicating information through a capacitive touch sensor. More specifically, the present invention relates to a system and method for communicating data of varying complexity through a capacitive touch sensor using pattern recognition (including geometric and time based pattern recognition).

Capacitive touch sensors include a variety of sensors, including the capacitive touch screens commonly used in smartphones and tablet computers. Capacitive touch screens typically include a transparent conductive coating applied to an insulating screen to create a panel that is sensitive to variations in the electrostatic field. When touched by an actively conducting electrical conductor (such as a human finger), the electrostatic field of the screen is distorted to cause a measurable change in capacitance (i.e., parasitic capacitance effect). The location of the sensed touch is interpreted by an associated controller.

Users typically interact with capacitive touch screens either with their fingers or special purpose capacitive styli. However, these tools are incapable of communicating complex information through capacitive touch screens, which is a well-known limitation of such screens.

Accordingly, a need exists for a system and method for communicating data of varying complexity through a capacitive touch sensors using pattern recognition (including geometric and time based pattern recognition) as described and claimed herein.

BRIEF SUMMARY OF THE INVENTION

In order to meet these needs, the present invention discloses systems and methods for communicating complex data through a capacitive touch sensor. For example, the systems and methods provided herein may be used to communicate through the touch sensor using geometric and/or time based pattern recognition. A device embodying the systems and methods described herein may affect a data connection through a capacitive touch sensor, enable a capacitive touch sensor to distinguish amongst various types of touches, etc. It is understood that the principles taught herein may be applied to any type of capacitive touch sensor, including capacitive touch screens.

The solutions provided herein include devices adapted to communicate through a capacitive touch sensor. The enhanced devices may communicate more information than simply whether a touch exists, where a touch is located, and whether and how a touch is moving. Based on the teachings provided herein, a device may perform any one or more of the following non-exhaustive examples of communication through a capacitive touch sensor: (1) communicate a plurality of uniquely identifiable touches; (2) mechanically switch between communicating a unique touch signature for each of a plurality of uniquely identifiable touches; (3) electrically switch between communicating a unique touch signature for each of a plurality of uniquely identifiable touches; (4) communicate a unique device signature distinguishing the device from other devices; (5) communicate the orientation of the device with respect to the capacitive touch screen; and (6) communicate a stream of data through the capacitive touch screen.

In one example, the device may be a stylus with a conductive tip that switches at variable frequencies. For example, the stylus may include: a housing; a power source; a selector, a controller; a switching mechanism; and a conductive tip. At the direction of the controller, the switching mechanism may switch on and off the electrical properties of the conductive tip at various frequencies. When used in conjunction with a capacitive touch screen whose corresponding controller is adapted to recognize the varied frequencies as distinct types of touches. For example, a stylus may be provided such that the electrical properties of the tip may be switched on and off at two distinct frequencies, with one frequency representing a "write" command and the second frequency representing an "erase" command. As such, when the stylus is placed in a first condition (for example, by moving the selector into a first position) to switch its electrical properties on and off at a first frequency, the movements of the stylus across the screen may be used to write on the screen. Then, when placed in a second condition (for example, by moving the selector into a second position) to switch its electrical properties on and off at a second frequency, the movements of the stylus across the screen may be used to erase any writing on the screen. Additional switching may be used to enable the stylus to write in various colors, stroke weights, stroke types (ink, paint, chalk, pastels, etc.).

In a similar example, the device may communicate various types of touches through the screen by a pattern of movement of the conductive element. For example, rather than switching on and off at a given frequency, the stylus may provide a conductive tip that oscillates between two positions at varying frequencies. In such an example, a slower frequency setting may be used to communicate the "write" command and a faster frequency setting may be provided to communicate the "erase" command.

In addition to, or as an alternative to, the frequency of switching or frequency of movement, the systems and methods provided herein may be adapted to communicate through a capacitive screen based on communicating patterns. Similar to a Morse code signal, the switching on and off of conductive element may communicate data ranging from simple to complex. Such information may be communicated not merely by the rate the conductive element switches on and off, but also by the pattern communicated by such switching. Similarly, the movement of a conductive element may be more complex than simply the frequency of oscillation between two points. The conductive element may be adapted to move in numerous geometric patterns (e.g., linearly, triangularly, in a square pattern, etc.). Combinations of frequency and geometry may be used to increase the complexity of the information communicated. For example, a conductive element may be adapted to move in ten different geometric patterns at each of five speeds for a total of fifty combinations of frequency and shape.

In another example, the system and methods provided herein may be embodied in a device that is able to transmit serial data streams through the capacitive screen. In such an example, the device may include a tip comprising a plurality of switchable conductive elements. For example, each of the switchable conductive elements may function as a "pin" in a virtual serial port connector. One of the switchable conductive elements may be adapted to operate as the "clock" providing timing pulses against which the remaining pins communicate their data. Each of the remaining pins may be identified by the capacitive screen by their distance from the clock pin. For example, nine switchable conductive elements may be provided to emulate a standard nine pin serial connector that uses 8-N-1 character framing to communicate data. Through such a device, a user may communicate complex data streams through the capacitive touch screen, whether to transfer data files, security keys, or other such data streams.

In other examples, of embodiments of the system and method provided herein, devices may be provided that may be uniquely recognized by a capacitive screen by the geometric configuration of a group of two or more conductive elements. For example, a capacitive screen may be adapted to function as a chessboard onto which chess pieces may be placed. Each of the chess pieces may be identified by the screen based on the configuration of conductive elements at the base of the chess piece. Each pawn may be recognized for its triangularly configured conductive elements, rooks for their square configuration, bishops for their pentagon configuration, etc. In addition, the white and black sides may be identified by the frequency at which the conductive elements are switched on and off, with each side's pieces transmitting data at a unique frequency. Similarly, each piece may be identified by the space between conductive elements, with pawns being identified as the smallest triangles, rooks slightly larger, bishops slightly larger still, etc. Further still, the distinction between the white and black sides may be based on geometric shapes, with triangles of various sizes representing the pieces on the white side and squares of various sizes representing the pieces on the black side.

A device embodying concepts of the system and method provided herein may be used to create an interactive tool for communicating through a capacitive touch screen. For example, a three dimensional object (e.g., a teddy bear) may be provided wherein key physical positions on the object (e.g., eyes, nose, mouth, ears, hands, feet, etc.) may each include a uniquely configured set of conductive elements such that the screen may recognize each unique position. Just as with the chess example provided above, the uniquely configured sets of conductive elements may be unique based on: the geometry (shape and/or size) of the conductive elements; the timing of conductive pulses in the case of switching conductors; the size, shape or frequency of movement of the conductors, etc. Thus, with each of the key elements of the three-dimensional object uniquely recognizable by the capacitive touch screen, a user may use the three dimensional object to interact with the capacitive touch screen. For example, the capacitive touch screen may be adapted to recognize the object (e.g., teddy bear) and "mirror" back an image of the object. As the object is moved with respect to the screen, the screen can recognize the movement (including three dimensional rotation) and respond appropriately.

As shown, the systems and methods provided herein enable the use of both active and passive devices to communicate various types of touches through a capacitive touch screen. While illustrative examples are provided herein, there is an exceptionally wide range of uses for the subject matter provided by the present disclosure. For example, two examples of passive security keys or secure communications are provided below.

In the first example a passive key may be provided to lock and/or unlock functions accessed through the capacitive screen. For example, a ring adapted to lock and unlock elements of a user's smartphone may be worn on the user's finger. The ring may include a metal band and a flat plastic (non-conducting) top. Three conductive pads may be provided on the top of the ring sunk through the plastic to the metal band underneath, wherein the conductive pads are placed at precise distances from one another. The ring may be used as a "key" by pressing the top against the capacitive screen, enabling the phone to be unlocked, etc. when the touch points measured exactly match the expected geometry of the user's stored key data. No batteries or circuitry are needed as the conducting pads on the top of the ring connect to the user's body through contact with the metal band of the ring worn on the user's finger.

In the second example, the systems and methods described herein may be adapted to encode a transaction card number within a passive device. For example, a transaction card may include a plurality of conductive pads placed at precise geometric locations on a first surface of the card adapted to be placed against a capacitive touch screen. On the opposing surface of the card, a conductive pad may be provided for placement of one of the user's fingers or thumb. The conductors on each side of the card may be electrically connected, for example by pins that span the opposing sides of the card. The precise geometric positioning of the conductive pads encodes the transaction card number on the card. To use the card, the user presses the conductive pads on the front of the card against the capacitive screen while pressing down on the metal coating on the other side of the card with a finger or thumb. This creates a conductive link between the user's body and the precisely positioned conductive pads contacting the screen. The capacitive screen may then read the credit card number from the position of the pins.

While described above as encoding the transaction card number itself, it is contemplated that the conductive pads may be used to communicate a security or verification code associated with the transaction card such that after a user provides the transaction card number through the capacitive touch screen, the actions described in the paragraph above may be used to communicate a secure code used to verify that the user possess the physical card at the time the information is being communicated.

In another example, the systems and methods described herein may be adapted to allow communication through a capacitive sensor using a device having two conductive tips, with a variable distance between them. For example, the device may be tweezers having conductive tips. The tweezers may be used to interact with a capacitive sensor to play a game. The capacitive sensor may read the distance between the conductive tips (whether uniquely identifiable tips or not), which allows the sensor to identify when the tweezers are open, closed, or in any intermediate position. To illustrate the point, a version of the game sold under the trademark Operation by Hasbro, Inc. may be adapted such that a user must use the tweezers to manipulate objects on a capacitive touch screen. To manipulate an object through the screen, a user may place the capacitive tips of the tweezers in contact with the screen while the tweezers are in an intermediate position, and then while the tips of the tweezers are touching the screen they may squeeze the tweezers so that the tips become closer to "grasp" the object through the screen. The user may then use the tweezers to rotate and/or move the object. Because the screen recognizes the location of both of the conductive tips (and the distance between them), the sensor can identify if, when and where the tweezers contact the screen and the condition of the tweezers (e.g., open, closed or in between).

As described above, various embodiments of the solutions provided herein communicate through a capacitive touch screen through patterns of movement. While in some examples the movement may be created through physical movement of elements of the device, it is contemplated that various embodiments of the solutions may communicate movement patterns through "logical movement" expressed by the switching on and off of two or more conductive elements in the device. For example, the tip of a device may include two semi-circular, electrically isolated/distinct conductive pads that together form a circular tip. When both pads are electrically active, the tip does not express any movement. When the pads are switched on and off in an alternating pattern (i.e., at time 1, the left pad is on and the right pad is off, at time 2, the left pad is off and the right pad is on, etc.), the capacitive touch sensor recognizes a movement of the touch from the center of the left pad to the center of the right pad and back. The speed of the logical movement may vary and/or the pattern of the logical movement may vary (e.g., left, left, right; left, left, right; repeat) to communicate different touches.

Of course, the tip design may include any number of conductive pads that may be switched on and off to create additional logical movement patterns. For example, the tip may include four pie shaped, electrically isolated/distinct conductive pads that together form a circular tip. In some instances, conductivity through alternating pairs of the four conductive pads may be used to mimic the movement described above with respect to the tip with two semi-circular conductive pads. Additionally, the embodiment with four conductive pads may create a circular movement by switching the conductive pads on and off consecutively in a circular pattern around the tip. In another example, the four pads may be switched on and off in a crisscrossing pattern (e.g., top, bottom, left, right, top, bottom, left, right, etc.). More complex tip designs can be implemented to provide additional and/or more complex patterns. A device including a tip divided into a greater number of distinct pads may be used to provide finer and/or more continuous logical movements.

As an alternative and/or in addition, the conductive pads on the tip of the device may be capacitive themselves and may be charged/discharged to varying levels to increase/decrease the pads' effect on the electrostatic field on the capacitive touch sensor. In such embodiments, the logical movement between the pads can be continuously varied movement, rather than binary. In other words, when a left pad is fully charged and a right pad is fully discharged, the touch is all the way to the left; when the left pad is 50% charged and the right pad is 50% charged, the touch is centered; when the left pad is fully discharged and the right pad is fully charged, the touch is all of the way to the right. As will be recognized by those skilled in the art, continuous logical movement can be provided by as the left pad-right pad are charged: 100%-0%, then 99%-1%, then 98%-2%, etc. Again, a greater number of distinct pads that can be charged/discharged to varying levels may be used to provide finer and/or more continuous logical movements.

Building on the embodiments in which the device includes one or more capacitive pads that may be charged/discharged to various levels to increase/decrease the parasitic capacitance effect of the device, a smaller tip design may be charged to mimic an even larger touch by having an intensified parasitic capacitance effect or vice versa. An example of the device may communicate a pattern through a capacitive touch sensor by intensifying/diminishing the strength of the parasitic capacitance effect.

The logical movement examples provided herein enable a capacitive touch sensor to distinguish between human finger touches and touches by a specific device. Devices such as those described herein are able to make movement patterns that are more consistently precise and repeatable than the movements of a person's fingers. Accordingly, a capacitive touch sensor may be adapted to distinguish between and treat differently, touches from a person and those from a device.

Numerous techniques may be employed in a capacitive touch sensor to improve or refine the recognition of touches. For example, a low pass filter may be employed to smooth the recognition of touch movement, i.e., add inertia to the recognized touch points. Similarly, a high-pass filter may be used to capture finer movements and movement patterns. Accordingly, any combination of one or more of a low pass filtered data, a high pass filtered data, and raw data may be analyzed separately or in any combination to improve movement pattern recognition.

Changes in sampling rates can also improve recognition of the movement and movement patterns. A higher the sampling rate (particularly one that is out of phase with the movement pattern) can improve recognition. It is understood that a sampling rate of twice the movement frequency is typically needed to accurately recognize the movement pattern. For example, if a device provides a logical movement pattern wherein the movement frequency is 30 hertz and the sampling rate is 60 hertz, the pattern recognition is approximately 100% accurate. However, in devices in which the speed of pattern recognition is important (minimize lag time), it may be helpful to increase both the pattern rate and the sampling rate.

In a given capacitive touch sensor the sampling rate may be a fixed frequency. Accordingly, there is not an opportunity to increase the sampling rate to allow for accurate detection of faster pattern rates. Accordingly, error recognition techniques may be employed to provide accurate recognition of pattern rates that are faster than one half of the sampling rate. For example, as noted above, if the sampling rate is fixed at 60 hertz, the pattern recognition will only be accurate up to a pattern frequency of 30 hertz. For purposes of minimizing lag time of the recognition of the pattern, it may be helpful to increase the pattern frequency, for example to 45 hertz. Knowing the pattern rate is 45 hertz and the sampling rate is 60 hertz enables the capacitive touch sensor to be adapted to recognize a predictable sampling rate error. If the predicted sampling error is observed, the pattern is recognized. If an error is detected more or less frequently than predicted, the capacitive touch sensor may confirm no recognition of the given pattern.

Further movement and pattern recognition techniques may be employed to improve the speed and/or accuracy of recognition of a given touch, movement, and/or pattern by a capacitive touch sensor. For example, in an embodiment in which a touch is communicated by cycling on and off of a touch at a given frequency (touch pulse), measuring and averaging the time or distance between four consecutive pulses may more accurately recognize the pattern. Similarly, as each touch pulse includes a start, middle, and end, measurements may be made between: a start to another start; a start to an end; a middle to another middle; etc., which enables even greater accuracy in pattern recognition.

A capacitive touch sensor may further be adapted to use the characteristics of a device's movement to predict future movement and increase the speed and accuracy of movement recognition. For example, based on a movement vector of a device, the capacitive touch sensor may create a cone of expected next touches. Then, if a subsequent touch falls within the cone of expected results (and/or more closely to the centerline of the cone of expected results), the sensor may recognize the touch with a fewer number of data points and/or with greater certainty. Of course, any number of machine learning algorithms may be employed similarly to increase the speed and accuracy of movement recognition, as will be recognized by those skilled in the art.

In one example, a device for communicating a plurality of distinct patterns through a conductive element includes: a conductive element adapted to conduct a first pattern and a second pattern, wherein the first conducted pattern and the second conducted pattern each provide a uniquely identifiable parasitic capacitance effect on a capacitive touch sensor; and a selector for selecting between conducting the first pattern and the second pattern. The first and second patterns may be geometric or time-based patterns. The selector may be a mechanical switch that physically moves two or more conductive pads into a first configuration to conduct the first pattern and physically moves the two or more conductive pads into a second configuration to conduct the second pattern. The selector may be an electrical switch that electrically controls two or more conductive pads to conduct the first pattern and electrically controls the two or more conductive pads to conduct the second pattern. The conductive element may be a conductive tip of a stylus and the stylus may further include a housing, a power source, a controller, and a switching mechanism, wherein the selector is incorporated into the housing and triggers the controller to conduct from the power source through the switching mechanism to the conductive tip, wherein the switching mechanism adapts the conductive tip to conduct the first pattern or the second pattern based on the condition of the selector.

In one embodiment, a method of communicating through a capacitive touch sensor, includes the steps of: providing a device for communicating a plurality of distinct patterns through a conductive element; placing the conductive element in contact with a capacitive touch sensor to provide a parasitic capacitance effect on the capacitive touch sensor; and interpreting the parasitic capacitance effect on the capacitive touch sensor to determine whether the device is communicating the first pattern or the second pattern. The device may include: a conductive element adapted to conduct a first pattern and a second pattern, wherein the first conducted pattern and the second conducted pattern each provide a uniquely identifiable parasitic capacitance effect on a capacitive touch sensor; and a selector for selecting between conducting the first pattern and the second pattern. The first and second patterns may be geometric or time-based patterns. The selector may be a mechanical switch that physically moves two or more conductive pads into a first configuration to conduct the first pattern and physically moves the two or more conductive pads into a second configuration to conduct the second pattern. The selector may be an electrical switch that electrically controls two or more conductive pads to conduct the first pattern and electrically controls the two or more conductive pads to conduct the second pattern. The conductive element may be a conductive tip of a stylus and the stylus may further include a housing, a power source, a controller, and a switching mechanism, wherein the selector is incorporated into the housing and triggers the controller to conduct from the power source through the switching mechanism to the conductive tip, wherein the switching mechanism adapts the conductive tip to conduct the first pattern or the second pattern based on the condition of the selector.

In another example, a device for communicating a distinctly identifiable touch through a capacitive touch sensor includes: one or more conductive elements that, when placed in contact with a capacitive touch sensor, are adapted to touch the capacitive touch sensor in a distinctly identifiable pattern incapable of being produced by a touch from a human finger (or an object whose movement is controlled by human movement). The touches capable of being produced from a human finger are representative of various touches that can be made through a capacitive touch sensor by previously existing technology. For example, it is known that a human finger can tap, double tap, swipe, pinch, etc. However, a human touch (or a touch through a stylus or other device controlled by human movement) is limited in the precision and repeatability of the patterns of movement. Similarly, the exact distances and geometric patterns measurable between multiple human finger touches cannot be maintained as precisely and reliably as those generated by the devices described herein. Accordingly, the devices described herein may be adapted to provide precise and repeatable patterns that simply cannot be reliably duplicated by a human touch or devices dependent on human control of their pattern of movement. For example, the distinctly identifiable pattern incapable of being produced by a touch from a human finger may include a distinctly identifiable geometric pattern formed by a plurality of conductive elements. The size and/or location of the conductive elements may be more complex and/or precise than what a person could replicate. In another example, the distinctly identifiable pattern incapable of being produced by a touch from a human finger may include a plurality of distances moved by the one or more conductive elements, wherein the distances moved are more precise than can be produced by a touch from a human finger. For example, oscillation at exactly eight pixels. In yet another example, the distinctly identifiable pattern incapable of being produced by a touch from a human finger may include a consistency of the pattern of movement that is more precise than can be produced by a touch from a human finger. For example, the pattern may be an oscillation of 45 hertz. In still another example, the distinctly identifiable pattern incapable of being produced by a touch from a human finger may include a distinctly identifiable pattern created by the activation and deactivation of conduction by the one or more conductive elements. While a finger (or an object controlled by a person) may tap a capacitive touch sensor, the device provided herein may activate and deactivate in such a precise pattern that a person cannot replicate it nor can an object controlled by a person replicate it. In still another example, the distinctly identifiable pattern incapable of being produced by a touch from a human finger may include a distinctly identifiable pattern created by the changes in speed and direction of motion of one or more conductive elements which are too precisely timed or physically demanding to have originated from a human finger (or an object controlled by a person). Such changes include changes in velocity and direction that are impossible for an object with the mass of a finger (or an object controlled by a person) to execute, but which are easily achievable by a device designed to generate "logical movement" via the sequential activation and deactivation of closely spaced conductive pads.

An advantage of the system and method provided herein is that it provides a way for a user to communicate a plurality of unique types of touches through a capacitive touch screen.

Another advantage of the system and method provided herein is that complex data and data streams may be communicated through a capacitive touch screen.

Yet another advantage of the system and method provided herein is that it distinguishes touches made with a finger and touches made with a device, such as a stylus. This advantage cannot be over emphasized. The subject matter taught herein completely eliminates one of the largest problems with using writing implements on capacitive sensors/screens, namely that a user previously could not rest his hand on the sensor as one would when writing on a piece of paper. Previously, resting one's hand on the sensor would be interpreted (i.e., confused) by the sensor as a writing touch. Because the systems and methods provided herein allow capacitive sensors to distinguish between a touch from the writing implement and the touch from the user's hand, a user may write precisely on the screen with the specially adapted writing implement while resting his hand on the screen without that touch being interpreted as additional writing.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 4b is a bottom view of the example of the communication system embodied in a transaction card shown in FIG. 4a.

FIG. 4c is a cross-sectional view of the example of the communication system embodied in a transaction card shown in FIG. 4a.

FIG. 8 is a flow chart depicting a method of communicating through a capacitive touch sensor.

DETAILED DESCRIPTION OF THE INVENTION

In order to meet these needs, the present invention discloses a system and method for communicating complex data through a capacitive touch sensor. For example, the system and method may be used to communicate through the touch sensor using geometric and time based pattern recognition.

Figure 1:
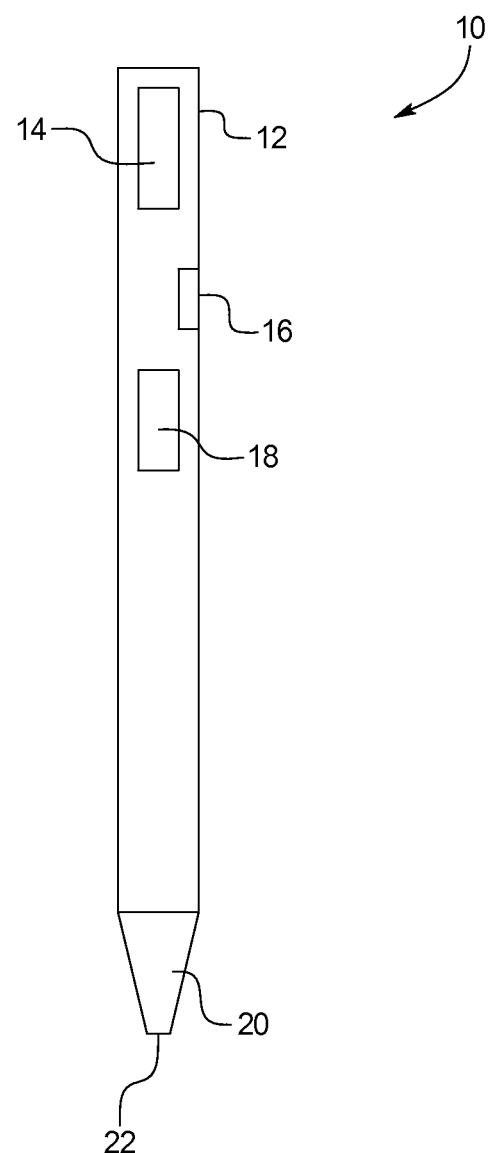
FIG. 1 is a side view of an example of the systems and methods provided herein embodied in a stylus.

FIG. 1 illustrates an example of an embodiment of the system and method provided herein. In the example provided in FIG. 1, a device 10 is provided that may be adapted to communicate various types of touches through a corresponding capacitive touch sensor (not shown). As shown in FIG. 1, the device 10 is a stylus including a housing 12, a power source 14, a selector 16, a controller 18, a switching mechanism 20 and a conductive tip 22. The various elements within the housing 12 are electrically connected as will be understood by one skilled in the art based on the disclosure provided herein.

In use, an electrical signal is passed through the conductive tip 22 to the capacitive sensor to provide a touch thereon. Depending on the implementation of the stylus 10, the housing 12 may be made from a conductive or non-conductive material. When the housing 12 is made from a conductive material, the user is electrically coupled to the stylus 10 and acts as an electrical source for the conductive tip 22. When the housing 12 is made from a non-conductive material, the user is decoupled from the conductive tip 22 and the power source 14 acts as the electrical source for the conductive tip 22.

The switching mechanism 20 is provided to connect and disconnect the conductive tip 22 from the electrical source (e.g., the power source 14 or the housing 12 in contact with the user). The controller 18 may be configured to control the switching mechanism 20 to connect and disconnect the conductive tip 22 from the electrical source at any of a number of frequencies and other recognizable patterns. The selector 16 is provided to enable the user to instruct the controller 18 to operate the switching mechanism 20 at a specific frequency/pattern. The selector 16 may be a mechanical switch, an electrical switch, a pressure sensor, or any other mechanism that enables a user to select between various states of the device. The power source 14 provides the power for the operation of the controller 18 and the switching mechanism 20.

By selecting between the various patterns or frequencies at which the switching mechanism 20 operates, the user may communicate various types of touches through the capacitive sensor. For example, multiple touches may be communicated to perform varied functions through the capacitive sensor (e.g., a first touch may be a write command, a second touch may be an erase command).

The patterns through which the device 10 and sensor may communicate may be any level of complexity. For example, it is contemplated that the patterns may be symmetrical or asymmetrical. A simple example of uniquely identifiable symmetrical patterns is a first touch that is an oscillating pattern that cycles on and off 30 times per second with a 50% duty cycle and a second touch that is an oscillating pattern that cycles on and off 15 times per second with a 50% duty cycle. An example of uniquely identifiable asymmetrical patterns is a first touch in which the conductive tip is "on" for $\frac{1}{15}$th of a second and then turned "off" for $\frac{1}{30}$th of a second with a duty cycle of 66.6% and a second touch in which the conductive tip 22 is "on" for $\frac{1}{30}$th of a second and then turned "off" for $\frac{1}{15}$th of a second with a duty cycle of 33.3%. Certainly, significantly more complex embodiments may be implemented as will be recognized by one skilled in the art based on the subject matter disclosed herein.

In addition to the electrical switching described above, the conductive tip 22 may be a physically moving conductive tip 22. In such an embodiment, the conductive tip 22 may be controlled to move in any of a plurality of known patterns. The capacitive sensor may recognize such patterns as unique touches based on the speed of the movement, the shape of the movement, the size/distance of the movement, etc. For example, the capacitive sensor may identify a first touch by a linear movement of the conductive tip 22 between two points a first distance apart and a second touch by a linear movement of the conductive tip 22 between two points that are a second distance apart. Similarly, the capacitive sensor may recognize the movement of the conductive tip 22 in a circle as a first touch and the movement of the conductive tip 22 in a triangle as a second touch. Moreover, it is contemplated that the moving conductive tip 22 may also incorporate the electrical switching described above to communicate using patterns of movement and electrical switching.

The conductive tip 22 may further include a pressure sensor to sense when the device 10 is in contact with a capacitive touch screen and determine the magnitude of pressure being applied. The pressure sensor may be used to activate the device in actively powered versions of the device 10. In addition to controlling the activation of the device 10, the pressure sensor may be used to initiate the communication of a unique pattern to the capacitive touch sensor. For example, when the device 10 is initially brought into contact with the sensor, the device may communicate a pattern (e.g., identification tag) recognized by the sensor as a specific type of touch. For example, a unique code may be repeated for some predetermined duration (e.g., six times, three seconds, etc.) Then, after the communication of the identification tag pattern, the device may switch to being continuously conductive (or otherwise, non-uniquely conductive) and as long as the device 10 remains in contact with the sensor, the touch will be recognized by its identification tag. Anytime the device 10 is lifted and replaced on the sensor, the identification tag would be communicated again. Such an embodiment may be used to reduce the power required to communicate unique touches (by using an identification tag communicated for a short duration) and improve the connectivity of the device 10 (by allowing the device to be continuously conducting after the identification tag has been communicated).

The pressure sensor may further be used to vary the type of touch being communicated to the sensor. For example, using a device 10 adapted to function as an electronic paintbrush, the pressure sensor may be used to determine the quality of the stroke being applied. Thus, a user may use the pressure of the device 10 to vary the thickness and other attributes of the brush stroke.

Figure 2A:
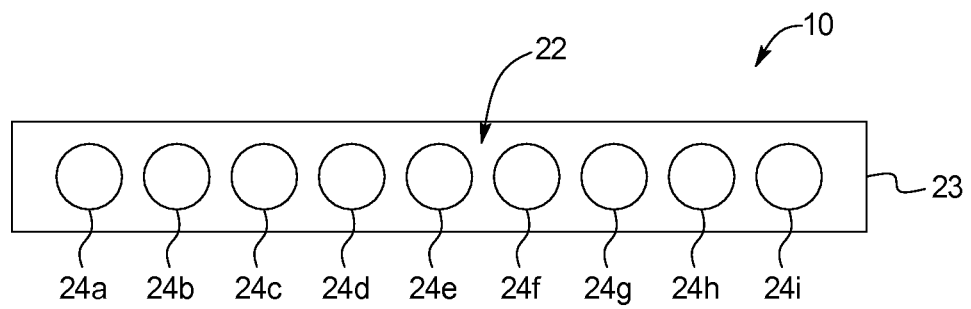
FIG. 2a is a bottom view of an example of the communication system implemented as a data port.
Figure 2B:
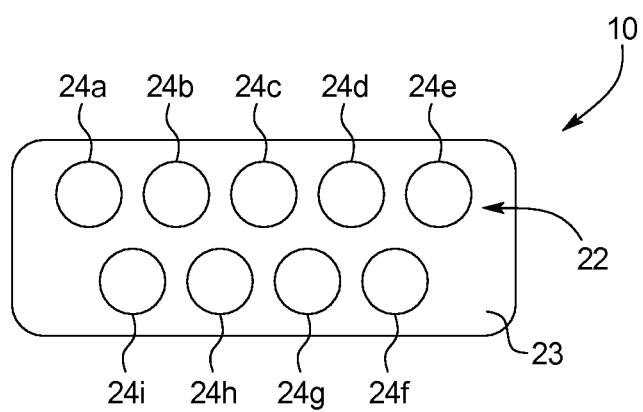
FIG. 2b is a bottom view of another example of the communication system implemented as a data port.

Turning now to FIGS. 2a and 2, the system and methods provided herein may be embodied in a device 10 that is able to transmit serial data streams through the capacitive sensor. In the example shown in FIGS. 2a and 2b, the device 10 includes a conductive tip 22 including a plurality of switchable conductive elements 24a-i provided in an insulated surface 23. In these examples, there are nine total switchable conductive elements 24a-i, though it will be understood that any number of two or more switchable conductive elements 24a-i may be adapted to communicate through a capacitive sensor as described with respect to FIGS. 2a and 2b. The other elements of the device 10 may be similar to the example described with reference to FIG. 1, including the housing 12, power source 14, selector 16, controller 18 and switching mechanism 20. However, as will be apparent based on the description provided herein, the switching mechanism 20 in the examples provided with reference to FIGS. 2a and 2b is adapted to independently switch on and off each of the switchable conductive elements 24a-i.

Each of the switchable conductive elements 24a-i may function as a "pin" in a virtual serial port connector. Any one of the switchable conductive elements 24a-i may be adapted to operate as the "clock" providing timing pulses against which the remaining pins (e.g., the remaining switchable conductive elements 24a-i) communicate their data. Each of the remaining pins may be identified by the capacitive sensor by their distance from the clock pin (e.g., any of the switchable conductive element 24a-i). For example, the nine switchable conductive elements 24a-i shown in FIGS. 2a and 2b may be provided to emulate a standard nine pin serial connector using 8-N-1 character framing to communicate data. Through such a device 10, a user may communicate complex data streams through the capacitive touch sensor, whether to transfer data files, security keys, or other such data streams.

The switchable conductive elements 24a-i may be configured in a linear row, such as shown in the example in FIG. 2a, in a pair of offset rows, such as shown in the example in FIG. 2b. However, it is contemplated that in other embodiments, the switchable conductive elements 24a-i may be configured in any manner, so long as each switchable conductive element 24a-i may be identified by the capacitive sensor by its distance from the "clock" pin and/or by its geometric position in relation to the "clock" pin and other conductive elements.

Figure 3A:
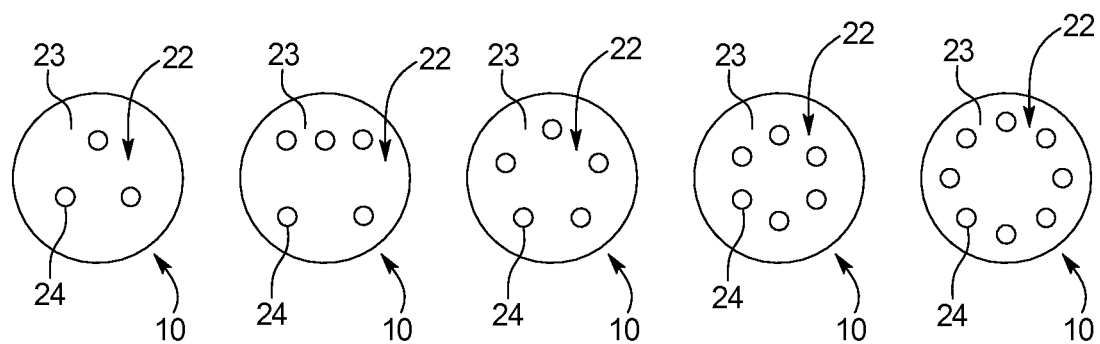
FIG. 3a is a series of bottom views of an example of the communication system embodied in chess pieces.

In the example shown in FIG. 3a, a set of devices 10 may be provided wherein a capacitive sensor may uniquely recognize subsets of the devices 10 by the geometric configuration of a group of three or more conductive elements 24. For example, a capacitive sensor may be adapted to function as a chessboard onto which the chess pieces (i.e., the devices 10) may be placed. Each of the chess pieces may be identified by the capacitive sensor based on the configuration of conductive elements 24 at the base of the chess pieces. As shown in FIG. 3a, each pawn may be recognized for its triangularly configured conductive elements 24, rooks for their square configuration, bishops for their pentagon configuration, etc. The conductive elements 24 on the bottom of the pawns may be configured into a variety of shapes to distinguish the various chess pieces. In addition, the white and black sides may be identified by the frequency at which the conductive elements are switched on and off, with each side's pieces transmitting data at a unique frequency.

Figure 3B:
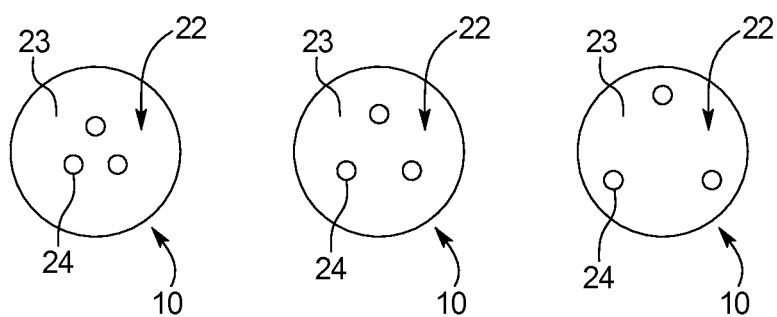
FIG. 3b is a series of bottom views of another example of the communication system embodied in chess pieces.

Similarly, in the example shown in FIG. 3b, each chess piece may be identified by the distance between the conductive elements 24, with pawns being identified as the smallest triangles, rooks slightly larger, bishops slightly larger still, etc. The distances between the conductive elements 24 for each geometric shape may vary and distinguish the various chess pieces. Further still, the distinction between the white and black sides may be based on geometric shapes, with triangles of various sizes representing the pieces on the white side and squares of various sizes representing the pieces on the black side.

Using the example of the capacitive sensor functioning as a chessboard and the devices 10 functioning as the chess pieces, additional examples of active and passive devices 10 may be provided. For example, in active devices 10, the device may periodically communicate to the sensor the location of the device 10 at a frequency fast enough to effectively monitor the position of the various chess pieces in real time. Alternatively, using passive devices 10, the grasping of the device 10 by a user may electrically activate the device 10 to communicate the position of the device 10 to the sensor. Accordingly, each time a user moves a chess piece, the device 10 communicates its position to the sensor.

Figure 4A:
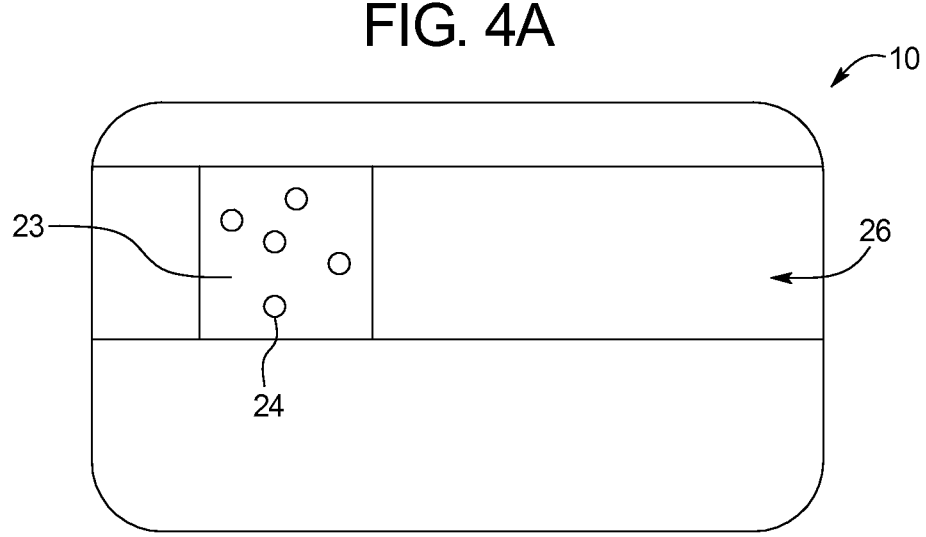
FIG. 4a is a top view of an example of the communication system embodied in a transaction card.
Figure 4B:
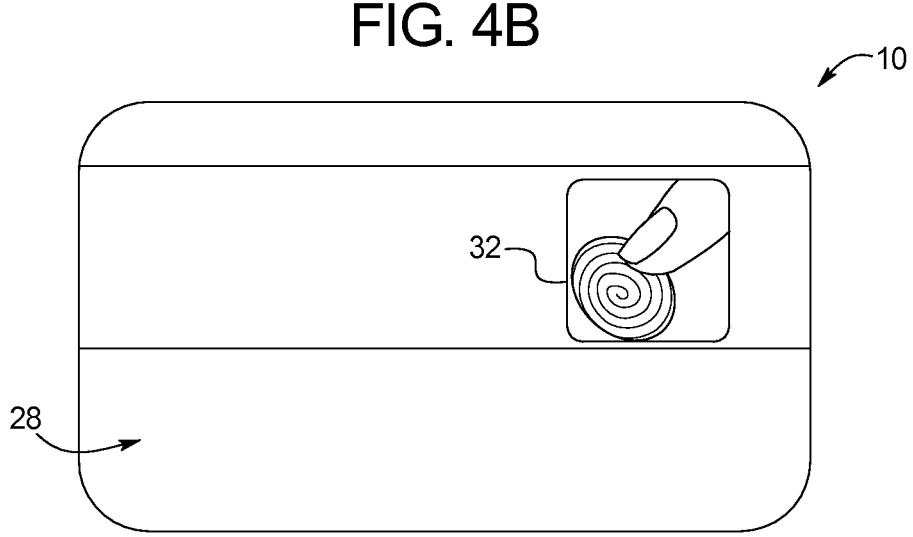
Figure 4C:
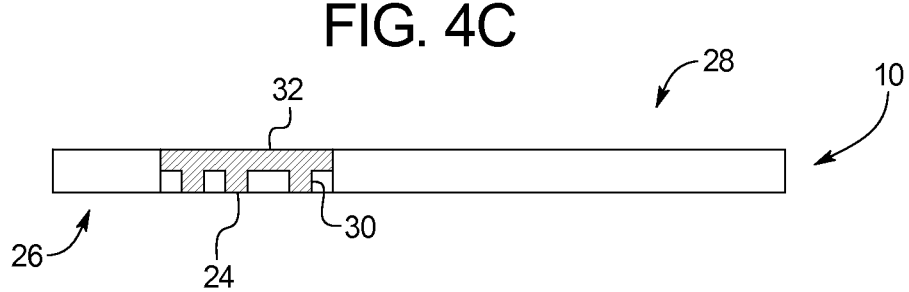

Turning now to FIGS. 4a-c, the systems and methods described herein may be adapted to encode a transaction card number within a passive device 10. For example, a transaction card device 10 may include a plurality of conductive elements 24 placed at precise geometric locations within an insulated surface 23 on a first surface 26 of the device 10, as shown in FIG. 4a. The conductive elements 24 and insulated surface 23 are configured to be placed against a capacitive touch sensor. On the opposing surface 28 of the device 10, a conductive pad 32 may be provided for placement of the user's fingers or thumb, as shown in FIG. 4b. As shown in FIG. 4c, the conductive elements 24 and the conductive pad 32 are electrically connected, for example by pins 30 that span the thickness of the device 10. The precise geometric relationship of the conductive elements 24 encodes the transaction card number within the device 10. Accordingly, any number of conductive elements 24 may be provided to enable a pattern of appropriate complexity. The limited number of conductive elements 24 shown in FIGS. 4a-c is merely for illustrative purposes. Further, a switch or trigger may actuate one or more of the conductive elements 24 such that the geometric pattern may be altered by the addition to or subtraction of one or more of the conductive elements 24 from the pattern, with each geometric pattern communicating a distinct touch or additional data.

To use the device 10 shown in FIG. 4a-c, the user places the conductive elements 24 in contact with the capacitive sensor while pressing a finger or thumb against the conductive pad 32. This creates a conductive link between the user's body and the conductive elements 24. The capacitive sensor may then recognize the uniquely identifiable transaction card "number" from the position of the conductive elements 24.

Figure 5A:
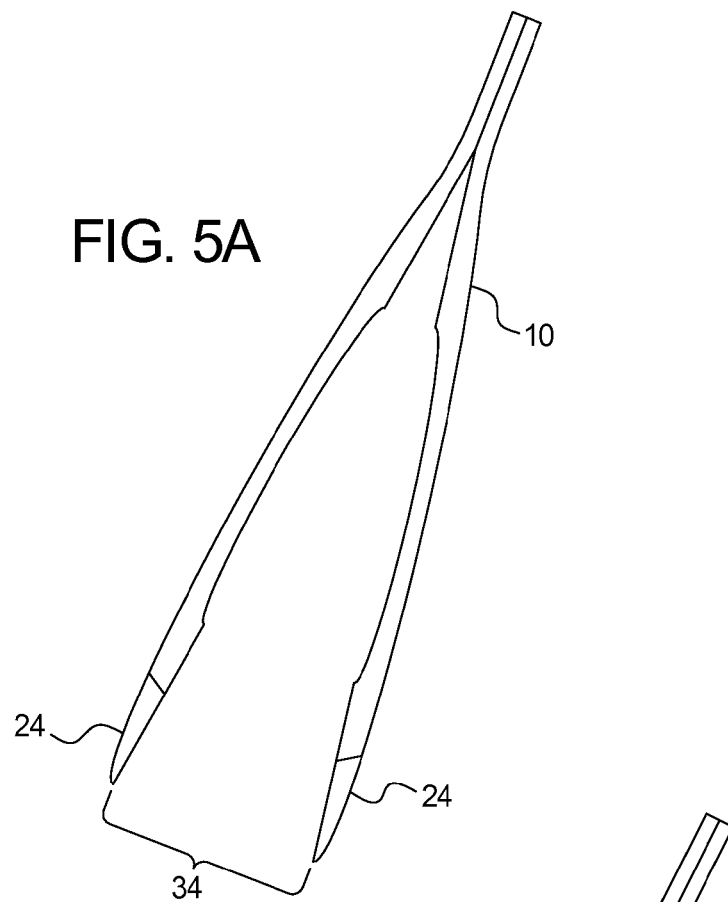
FIG. 5a is a side view of an example of the systems and methods provided herein embodied in a pair of tweezers shown in a first position.
Figure 5B:
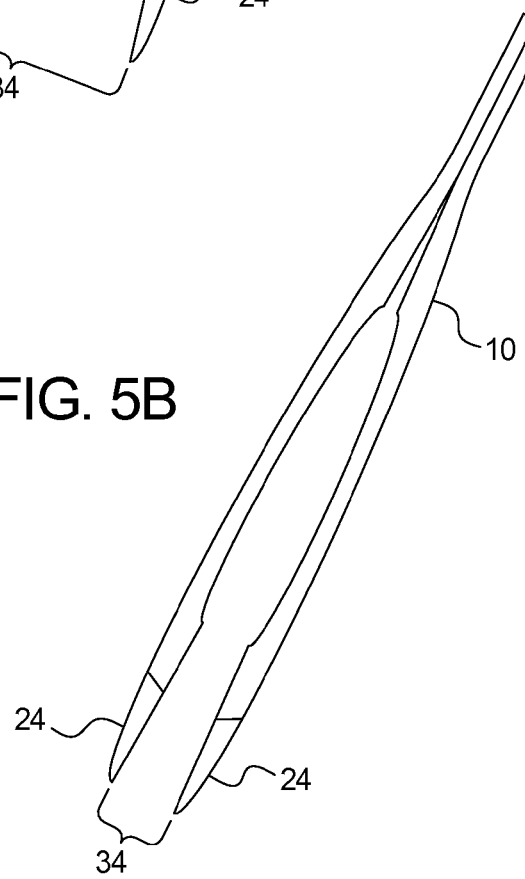
FIG. 5b is a side view of tweezers of FIG. 5a shown in a second position.

In yet another example, the systems and methods described herein may be adapted to allow communication through a capacitive sensor using a device 10 having two conductive elements 24, with a variable distance between them. For example, the device 10 may be tweezers having conductive tips, as shown in FIGS. 5a and 5b. The tweezers may be used to interact with a capacitive touch sensor to play a game. The capacitive touch sensor may read the distance 34 between the conductive elements 24 (whether uniquely identifiable tips or not), which allows the sensor to identify when the tweezers are open (as shown in FIG. 5a), closed (as shown in FIG. 5b), or in any intermediate position. To illustrate the point, a version of the game sold under the trademark Operation by Hasbro, Inc. may be adapted such that a user must use the tweezers to manipulate objects on a capacitive touch screen (e.g., to grasp, rotate and move elements of the game though a capacitive touch screen). To manipulate an object through the screen, a user may place the capacitive elements 24 (e.g., conductive tips) of the device 10 (e.g., tweezers) against the sensor while the tweezers are in an open or intermediate position, and then, while the conductive elements 24 of the device 10 are touching the sensor, the user may squeeze the tweezers so that the conductive tips become closer to "grasp" the object through the sensor. The user may then use the device 10 to rotate and/or move the object. Because the screen recognizes the location of both of the conductive elements 24 (and the distance between them), the sensor can identify if, when and where the device 10 contacts the sensor and the condition of the device 10 (e.g., whether the tips are open, closed or in between).

Figure 6A:
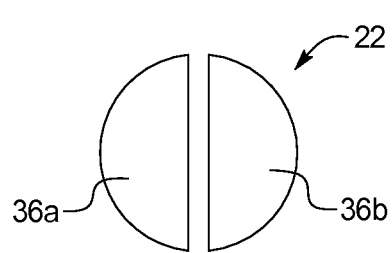
FIGS. 6a-6e are bottom views of various tips of a stylus, such as the stylus shown in FIG. 1.

As described above, various embodiments of the device 10 provided herein communicate through a capacitive touch screen through patterns of movement. While in some examples the movement may be created through physical movement of elements of the device 10, it is contemplated that various embodiments of the solutions may communicate movement patterns through "logical movement" expressed by the switching on and off of two or more conductive elements 36 in the conductive tip 22 of the device 10. For example, as shown in FIG. 6a, the conductive tip 22 of a device 10 may include two semi-circular, electrically isolated/distinct conductive pads 36 that together form a circular pattern. When both conductive pads 36 are electrically active, the conductive tip 22 does not express any movement itself (as compared to movement of the conductive tip 22 across the capacitive touch sensor). When the conductive pads 36 are switched on and off in an alternating pattern (i.e., at time 1, conductive pad 36a is on and conductive pad 36b is off, at time 2, conductive pad 36a is off and conductive pad 36b is on, etc.), the capacitive touch sensor recognizes a movement of the touch from the center of the left conductive pad 36 to the center of the right conductive pad 36 and back. The speed of the logical movement may vary and/or the pattern of the logical movement may vary (e.g., 36a, 36a, 36b; 36a, 36a, 36b; repeat) to communicate different touches.

Figure 6B:
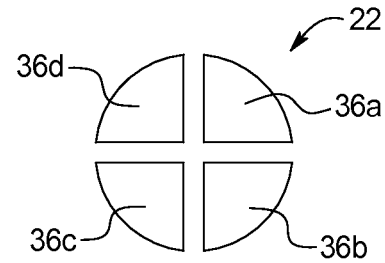

Of course, the conductive tip 22 design may include any number of conductive pads 36 that may be switched on and off to create additional logical movement patterns. For example, as shown in FIG. 6b, the conductive tip 22 may include four pie shaped, electrically isolated/distinct conductive pads 36 that together form a circular conductive tip 22. In some instances, conductivity through alternating pairs of the four conductive pads 36 may be used to mimic the movement described above with respect to the conductive tip 22 in FIG. 6a. Additionally, the embodiment shown in FIG. 6b may create a circular movement by switching the conductive pads 36 on and off consecutively in a circular pattern around the conductive tip 22 (36a to 36b to 36c to 36d). In another example, the four conductive pads 36 shown in FIG. 6b may be switched on and off in a criss-crossing pattern (e.g., 36a to 36c to 36b to 36d). More complex conductive tip 22 designs can be implemented to provide additional and/or more complex patterns. A device 10 including a conductive tip 22 divided into a greater number of distinct conductive pads 36 may be used to provide finer and/or more continuous logical movements.

Figure 6C:
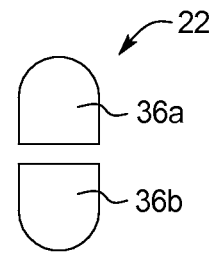

The example of the circular conductive tip 22 shown in FIG. 6a may have a distance of three pixels from the centroid of the first conductive pad 36a to the centroid of the second conductive pad 36b. By comparison, while maintaining the same maximum diameter as the circular conductive tip 22 shown in FIG. 6a, the ovular conductive tip 22 shown in FIG. 6c may have a distance of five pixels from the centroid of the first conductive pad 36a to the centroid of the second conductive pad 36b. Accordingly, the distance of the movement created by alternatively turning on and off the conductive pads 36 is greater in the example shown in FIG. 6c without having to increase the outer dimensions of the conductive tip 22.

Figure 6D:
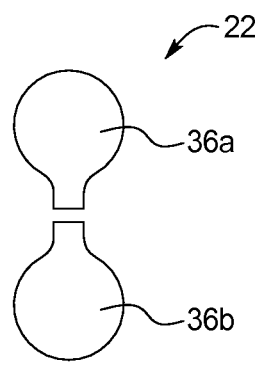

The example of the conductive tip 22 shown in FIG. 6d further demonstrates how the shape of the conductive tip 22 and conductive pads 36 may be modified to increase the distance of movement generated by alternating the operation of a pair of conductive pads 36. The distance between the centroids of the conductive pads 36 in the example shown in FIG. 6d is greater than the distance between the centroids of the conductive pads 36 in the examples shown in either FIG. 6a of FIG. 6c.

Figure 6E:
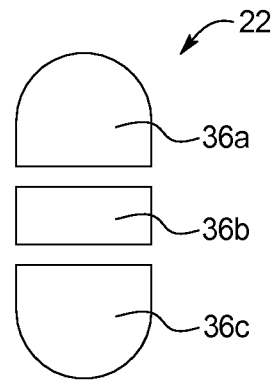

In the example shown in FIG. 6e, three conductive pads 36 may be used to provide five potential touch locations: (i) centroid of the conductive tip 22; (ii) centroid of top conductive pad 36a; (iii) centroid of the bottom conductive pad 36c; (iv) between the top conductive pad 36a and the middle conductive pad 36b; and (v) between the middle conductive pad 36b and the bottom conductive pad 36c.

As an alternative and/or in addition, the conductive pads 36 on the conductive tip 22 of the device 10 may be capacitive themselves and may be charged/discharged to varying levels to increase/decrease the conductive pads' effect on the electrostatic field on a capacitive touch sensor. In such embodiments, the logical movement between the conductive pads 36 can be continuously varied movement, rather than binary. In other words, when a left conductive pad 36 is fully charged and a right conductive pad 36 is fully discharged, the touch is all the way to the left; when the left conductive pad 36 is 50% charged and the right conductive pad 36 is 50% charged, the touch is centered; when the left conductive pad 36 is fully discharged and the right conductive pad 36 is fully charged, the touch is all of the way to the right. As will be recognized by those skilled in the art, continuous logical movement can be provided by as the left pad-right conductive pads 36 are charged: 100%-0%, then 99%-1%, then 98%-2%, etc. Again, a greater number of distinct conductive pads 36 that can be charged/discharged to varying levels may be used to provide finer and/or more continuous logical movements. Of course it is understood that the capacitive conductive pads 36 may be moveable (actively or passively) such that additional movement patterns may be provided.

Building on the embodiments in which the device 10 includes one or more capacitive pads 36 that may be charged/discharged to various levels to increase/decrease the parasitic capacitance effect of the device 10 on a capacitive touch sensor, a smaller conductive tip 22 design may be charged to mimic an even larger touch by having an intensified parasitic capacitance effect or vice versa. An example of the device 10 may communicate a pattern through a capacitive touch sensor by intensifying/diminishing the strength of the parasitic capacitance effect.

Figure 7:
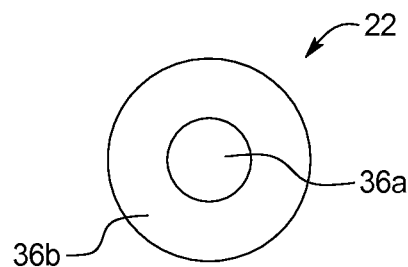
FIG. 7 is another bottom view of tips of a stylus, such as the stylus shown in FIG. 1.

Turning now to FIG. 7 an example of a conductive tip 22 with concentric conductive pads 36 is shown. In this example, a pattern may be communicated through the conductive tip 22 of the device 10 using three distinct touches: (i) both of the conductive pads 36 are off; (ii) the central conductive pad 36a is on and the outer conductive pad 36b is off; and (iii) both of the conductive pads 36 are on. This may be used both for additional pattern elements, as well as to increase or decrease the effective size of the touch being communicated through a capacitive touch screen.

FIG. 8 is a flow chart depicting a method 100 of communicating through a capacitive touch sensor. As shown in FIG. 8, the method 100 includes the steps of: providing a device 10 for communicating a plurality of distinct patterns through a conductive element 24 (step 110); placing the conductive element 24 in contact with a capacitive touch sensor to provide a parasitic capacitance effect on the capacitive touch sensor (step 120); and interpreting the parasitic capacitance effect on the capacitive touch sensor to determine whether the device 10 is communicating the first pattern or the second pattern (step 130). The device 10 may include: a conductive element 24 adapted to conduct a first pattern and a second pattern, wherein the first conducted pattern and the second conducted pattern each provide a uniquely identifiable parasitic capacitance effect on a capacitive touch sensor; and a selector 16 for selecting between conducting the first pattern and the second pattern. The first and second patterns may be geometric or time-based patterns. The selector 16 may be a mechanical switch that physically moves two or more conductive pads 36 into a first configuration to conduct the first pattern and physically moves the two or more conductive pads 36 into a second configuration to conduct the second pattern. The selector 16 may be an electrical switch that electrically controls two or more conductive pads 36 to conduct the first pattern and electrically controls the two or more conductive pads 36 to conduct the second pattern. The conductive element 24 may be a conductive tip 22 of a stylus 10 and the stylus 10 may further include a housing 12, a power source 14, a controller 18, and a switching mechanism 20, wherein the selector 16 is incorporated into the housing 12 and triggers the controller 18 to conduct from the power source 14 through the switching mechanism 20 to the conductive tip 22, wherein the switching mechanism 20 adapts the conductive tip 22 to conduct the first pattern or the second pattern based on the condition of the selector 16.

Based on the various examples provided above, it is understood that the present subject matter may be used to implement various methods and systems for communicating and/or identifying unique touches through a capacitive touch sensor. The disclosure may be adapted to provide both hardware and software solutions. It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A device for communicating a plurality of distinctly identifiable touches through a capacitive touch sensor comprising:
   a conductive element electrically coupled to a power source through a switching mechanism;
   a controller operatively coupled to the switching mechanism, wherein the controller directs the switching mechanism to switch on and off the electrical properties of the conductive element between an off condition, a first pattern and a second pattern, wherein the off condition provides no identifiable parasitic capacitance effect on a capacitive touch sensor and the first conducted pattern and the second conducted pattern each provide a uniquely identifiable parasitic capacitance effect on the capacitive touch sensor, further wherein at least one of the first pattern and the second pattern is a dynamic pattern characterized by the switching on and off of the conductive element to communicate a repeating time-based pattern; and
   a selector for selecting between the off condition, conducting the first pattern and conducting the second pattern.

2. The device of claim 1 wherein the first pattern and the second pattern are dynamic repeating time based patterns.

3. A method of communicating through a capacitive touch sensor, comprising the steps of:
   providing a device for communicating a plurality of distinct patterns through a conductive element;
   placing the conductive element in contact with a capacitive touch sensor to provide a parasitic capacitance effect on the capacitive touch sensor; and interpreting the parasitic capacitance effect on the capacitive touch sensor to determine whether the device is communicating a first pattern or a second pattern, wherein at least one of the first pattern and the second pattern is a dynamic repeating pattern characterized by the switching on and off of the conductive element to communicate time-based pattern, wherein the conductive element is a conductive tip of a stylus, the stylus further comprising a housing, a power source, a controller, a selector, and a switching mechanism, wherein the selector is incorporated into the housing and triggers the controller to conduct from the power source through the switching mechanism to the conductive tip, wherein the switching mechanism adapts the conductive tip to conduct the first pattern or the second pattern based on the condition of the selector.

4. The method of claim 3 further including a selector for selecting between conducting the first pattern and the second pattern.

5. The method of claim 3 wherein the first pattern and the second pattern are dynamic repeating time based patterns.

6. A multi-touch stylus comprising:
- a conductive tip electrically coupled to a power source through a switching mechanism;
- a controller operatively coupled to the switching mechanism, wherein the controller directs the switching mechanism to switch on and off the electrical properties of the conductive tip between an off condition, a first pattern, and a second pattern, wherein the first pattern and the second pattern are defined by a repeating series of on and off pulses of the electrical properties of the conductive tip; and
- a selector operatively coupled to the controller through which a user selects between the off condition, the first pattern, and the second pattern.

7. The multi-touch stylus of claim 6 wherein the first pattern is an on/off pattern at a first frequency and the second pattern is an on/off pattern at a second frequency.

* * * * *